US010551826B2

(12) United States Patent
Popa-Simil et al.

(10) Patent No.: US 10,551,826 B2
(45) Date of Patent: Feb. 4, 2020

(54) METHOD AND SYSTEM TO INCREASE OPERATOR AWARENESS

(71) Applicants: Andrei Popa-Simil, Los Alamos, NM (US); Victor Popa-Simil, Los Alamos, NM (US)

(72) Inventors: Andrei Popa-Simil, Los Alamos, NM (US); Victor Popa-Simil, Los Alamos, NM (US)

(73) Assignee: Andrei Popa-Simil, Los Alamos, NM (US)

( * ) Notice: Subject to any disclaimer, the term of this patent is extended or adjusted under 35 U.S.C. 154(b) by 323 days.

(21) Appl. No.: 15/079,387

(22) Filed: Mar. 24, 2016

(65) Prior Publication Data
US 2017/0277166 A1 Sep. 28, 2017

(51) Int. Cl.
*G06T 19/00* (2011.01)
*G05B 19/418* (2006.01)

(52) U.S. Cl.
CPC .......... *G05B 19/4184* (2013.01); *G05B 2219/31455* (2013.01); *G05B 2219/31481* (2013.01); *G05B 2219/32014* (2013.01)

(58) Field of Classification Search
None
See application file for complete search history.

(56) References Cited

U.S. PATENT DOCUMENTS

| 9,298,283 | B1 * | 3/2016 | Lin | G06F 3/0346 |
|---|---|---|---|---|
| 9,759,917 | B2 * | 9/2017 | Osterhout | G02B 27/0093 |
| 2002/0158873 | A1 * | 10/2002 | Williamson | G06T 15/20 345/427 |
| 2012/0194553 | A1 * | 8/2012 | Osterhout | G02B 27/0093 345/633 |
| 2015/0262208 | A1 * | 9/2015 | Bjontegard | G06Q 30/0205 705/7.31 |
| 2016/0343163 | A1 * | 11/2016 | Venkatesha | G06T 19/006 |

* cited by examiner

*Primary Examiner* — Sunit Pandya

(57) ABSTRACT

A method and system to increase operator awareness for process control application providing operators team real time information on controlled process and equipment immersing them into augmented and virtual reality, provided by a computing system which collects and integrates data from process and equipment, leaving equipment, controls, and procedure unmodified. The method is creating an augmented and virtual reality for the operating crew, giving them real time supplementary information based on two types of simulation, one using models and one using process data and learning procedures, together with rich equipment data, equipment locator, enhanced communication and enhanced data acquisition from supplementary sources as surface and airborne robotic and operator headset additional equipment meant to monitor operator bio-parameters and operator's surrounding environment in order to assure that control is sound and sober, and operators are safe and secure all time providing an optimum high efficiency operation of the controlled process.

11 Claims, 8 Drawing Sheets

(previously presented)

Fig.1 (previously presented)

Fig.2 (previously presented)

METHOD AND SYSTEM TO INCREASE OPERATOR AWARENESS

STATEMENT REGARDING FEDERALLY SPONSORED R&D

This invention was made with NO Government support.

NAMES OF PARTIES TOA JOINT RESEARCH AGREEMENT

This work was part of research of the mentioned inventors.

CROSS REFERENCE TO RELATED APPLICATIONS

This Application claims no priority.

BACKGROUND OF THE INVENTION

1. Field of the Invention

The present invention relates to a method and device to increase the quality of an industrial plant's control and other complex equipment used in power production as coal, oil, nuclear, etc., or industry as done by a team of operators, based on the newest augmented reality technologies.

There are various levels of equipment added on the body depending on the needs and functions one operator has to perform. Virtual reality devices are allowing operators to see inside the power plant or installation in a case sensitive mode, having various themes, as condition of the equipment, operational equipment, efficiency of use of each device, control system status, inside simulated view of the equipment, temperatures, pressures compliance with the systems, abnormal activities, predictions for possible future options, etc.

The system consists in a mobile sensor array support, sensors and microprocessor system and a plurality of receiving processing stations.

This method consists in a set of procedures to acquire the data, process it and based on evolution trend to predict with anticipation the next necessary actions

2. Description of the Prior Art

There are many industrial process control structures, that require increased operating crew awareness on the controlled system, from which nuclear reactor structures, are among the most complex, and with the highest safety and public opinion impact in case of failure, and that is why we paid special attention to nuclear reactors control, but the main goal is on possible applications to other industrial processes control systems, because in spite the accidents in these plants are not as famous as nuclear reactor mishaps, the damage brought to environment and economy are by several orders of magnitude larger, happening with a frequency of few major accidents every year.

An example on complexity of actual process control structures one may see how GE-Hitachi's amended Advanced Boiling Water Reactor design, downloadable from: https://nuclearstreet.com/nuclear_power_industrynews/b/nuclearpower_news/archive/2011/11/02/nrc-approves-amended-abwr-design-for-new-nuclear-plants-110202 It was developed by the now-merged nuclear divisions of General Electric and Hitachi, as well as Toshiba, the 1350-to-1460-megawatt-electric ABWR (Advanced Boiling light Water Reactor) design was first certified by the NRC (Nuclear Regulatory Commission) in 1997 and has been under consideration for two new reactors at the South Texas Project near Houston. Although NRG Energy, a key investor in that project, pulled out of the venture, its partner Toshiba continued to seek approval of a design change to bring the ABWR in line with enhanced safety requirements put in place after 9/11.

The actual fleet of world nuclear reactors is 438 nuclear power plants in operation in the year 2016, and since 1942, when the first nuclear reactor have been commissioned about 4 major accidents two with INES (International Nuclear Event Scale) level of 6 and another two with INES level 7 happened, and many minor accidents, and incidents take place every year, inflicting material losses to owners and public distress. In fact, in spite death rate is much lower than for road transportation that scales 30,000 causalities/year in US only, commercial aviation that is in the range of few hundred per year, every year, due to secrecy, military application and people ignorance, made public more leery on nuclear events than on any other mishap. The only problem is that compared to industrial accidents, nuclear reactor accidents are well documented, and there is easy to get a lesson learned from there.

The system is indeed very complex, and we paid attentions more to accidents, as a boost for this patent development because we intended to find out the triggers of these accidents, the impact of human factor and how a technological development might help in prevent or minimize the consequences of such unfortunate events that can be briefly characterized that on a previously unknown that is distressed system a perturbation is added that becomes critical and triggers a chain of critical events that are countered by underperformance and bad decisions of the operating crew, which seals the fate of the equipment and ends up in an accident instead of an incident.

Analyzing these accidents we noticed, that at Three Miles Island failure, to transmit a lesson learned about reliability of a pressure valve, that was a main trigger of events, and operators failure to understand the correlation between various parameters was what sealed the fate of the reactor.

It is difficult for someone without at least 10 year experience to know where everything is located. For a new operator, navigating inside this complex labyrinth of rooms full of equipment one might need something like a GPS device with an equipment locater and I would also need something to tell what that equipment is and something to tell how to use it and what might happen if I modify the control on it. For example it took about 6 hours for the Fukushima team to find a pressure safety valve, and open it to prevent a Chernobyl like explosion, but they end up with a hydrogen explosion instead.

In FIG. 1 Nuclear accident brief compared with industrial accidents causalities as part of the current state of the art technology level of hazard as part of the state of the art.

On the right ordinate the variation of operational reactors' number is shown, in the dotted curve ending at about 440 in year 2015. It is observed that this number remained stationary after the Chernobyl accident that acted as a strong deterrent of nuclear power development, many nations seriously reconsidering the nuclear option.

The function was plotted using the thin, continuous line segments, with its values displayed on the right ordinate in logarithmic scale. A trend straight line is plotted showing that the probability of INES accident is decreasing as an exponential, in present being smaller than 1 in 1000 reactors per year. The probability of high severity accidents basically follows the general trend, making the actual wait time to the next major accident longer than 40 years, probably by 2040s, if nothing outstanding happens.

In spite industrial accidents' causalities are by more than an order of magnitude higher than those coming from nuclear power, public's exigency is increased towards nuclear power, due to its hard to understand manifestations and its scary debut, associated to past and present military use.

Human factor is determinant in sealing the fate of an installation undergoing a series of critical events, and that is why at the heart of the DOE's Research and Education Facility is the Nuclear Power Plant Main Control Room (NPP MCR) simulator room, where some of the key features include:

a) Reconfigurable Modular Consoles
b) Simulator System Hardware and Interface Setup
c) The Human Factors Observation and Monitoring Gallery
d) Human Performance Measurement Systems
e) Integrated Instrumentation and Control Systems On the web page http://www.kepco-enc.com/korea/sub.asp?Mcode=F01000&BID=B44&idx=105&BoardType=view, where Tecnatom is participating in the supply of the control rooms for reactors 3 and 4 of the Fuqing nuclear power plant, in China, and has signed a new contract to participate in the supply of the instrumentation, process systems and control rooms of the two new groups of the Chinese Fuqing nuclear power plant.

That scope of the works includes the following:

Engineering of the Man-Machine Interface and, as a result, design of the operating screens and of the digital Control Room itself and of the remote shutdown panel, and has improved design and development of the Operating Aid Systems: the computerized Operating Procedures and Advanced Alarms system.

The awarding of this contract, which comes in the wake of those for Fuqing 1 and 2, Fangianshan 1 and 2 and Hainang 1 and 2, means a new and important backing for Tecnatom and makes the company a reference at international level in the field of new reactors.

This design seems more advanced than what we found in the other power production plants futuristic designs, or general industrial automation where evolutionary little changes are preferred to game changing solutions, but fails to solve the main difficulty for the operator, consisting in watching in real time the evolution of several parameters in order to control the process.

The most difficult aspect our invention wants to solve is correlation and interpretation of the indications of the instruments placed in such panels is difficult for many and very complex for those who know. As you see, the operators in both cases, no matter if panel is older or newer, is pointing hands in different direction and looking in another, even in a most advanced virtual room. See: http://phys.org/news/2013-08-virtual-room-nuclear-industry.html Virtual control room helps nuclear operators, industry is where The Department of Energy's new Human System Simulation Laboratory at Idaho National Laboratory is a full-scale virtual nuclear control room that can test the safety and reliability of proposed technology replacements before they are implemented in commercial nuclear control rooms, may be seen on: https://www.pinterest.com/insensertech/control-rooms/These are the modern designs of the future control rooms, but the problem remains the same as shown in the right side interrelation between several indication spread on the screens.

Examples of stereoscopic images may be used to create virtual reality giving a very good sensation of 3D visualization. In the upper left corner, there is an example of Google Cardboard. The image is split into 2 images https://developers.google.com/cardboard/Cardboard aims at developing accessible virtual reality (VR) tools to allow everyone to enjoy VR in a simple, fun, and natural way. The Cardboard SDKs for Android and Unity enable you to quickly start creating VR apps or adapt your existing application for VR. http://www.theverge.com/2014/6/25/5842188/googles-cardboard-turns-your-android-device-into-a-vr-headset The result is Google Cardboard, which in its current state requires some and cannot simply be bought as a completed product. In order to build it you need a pair of lenses with a 40 mm focal distance to keep the phone's screen in focus. The kit also requires magnets, Velcro, a rubber band, and an NFC tag if you want to tap your device to the headset to launch the app right away. The magnet and rubber band serve as a makeshift hardware button for your phone, something decidedly analog. https://forums.oculus.com/viewtopic.php?t=5800&start=240

Representation of how oculus prototype "Crystal Cove" is made may be seen at http://www.hypergridbusiness.com/2015107/product-review-sunnypeak-virtual-reality-headset/ Same function as Google Cardboard except made of plastic and with more functions. https://www.osapublishing.org/aop/fulltext.cfm?uri=aop-5-4-456&id=274728 Color-interlaced anaglyph stereo, where color-code 3D is a newer, patented stereo viewing system deployed in the 2000s by Sorensen et al that uses amber and blue filters that can be seen at: http://www.augmentedrealitytrends.com/augmented-reality/3-amazing-ar-vr-innovations-mwc.html The concept is still in its formative years and it depends on thermal imaging cameras to track the residual heat that is left by our body on any surface that it touches. The heat signatures from our fingerprints are used by Metaio as a means to input data.

Nokia reveals new City Lens augmented reality app for Windows Phone 8 lineup handset. http://www.engadget-.com/2012/09/11/nokia-reveals-n New to the Lumia 920 and Lumia 820, Nokia has announced a refined version of City Lens replete with 3D icons and the ability to disable suggestions that aren't within the line of sight http://www.craveonline.com/design/811705-5-reasons-google-glass-failed-miserably#/slide/1 Virtual and Augmented reality applications started to appear, but applying it in industrial environment is a more complex responsible task, because it has to be reliable easy to use, and fail safe.

DEFINITIONS

Virtual reality—the computer-generated simulation of a three-dimensional image or environment that can be interacted with in a seemingly real or physical way by a person using special electronic equipment, such as a helmet with a screen inside or gloves fitted with sensors.

Augmented reality—a technology that superimposes a computer-generated image on a user's view of the real world, thus providing a composite view.

Stereoscopy—sometimes called stereoscopic imaging, is a technique used to enable a three-dimensional effect, adding an illusion of depth to a flat image. Stereopsis, commonly (if imprecisely) known as depth perception, is the visual perception of differential distances among objects in one's line of sight.

CASL—is The Consortium for Advanced Simulation of Light Water Reactors (CASL) was established to provide leading edge modeling and simulation (M&S) capability to improve the performance of currently operating light water reactors.

LIDAR—is a surveying technology that measures distance by illuminating a target with a laser light. Although thought by some to be an acronym of Light Detection And Ranging, the term LIDAR was actually created as a portmanteau of "light" and "radar".

Holistic—relating to or concerned with complete systems rather than with individual parts bio-parameter is referring to biometric and medical applications where body monitoring is needed by using specialized sensors as: pulse, oxygen in blood ($SPO_2$), airflow (breathing), body temperature, electrocardiogram (ECG), electromyogram (EMG), electro-encephalogram (EEG), skin conductivity (sweat), glucometer, galvanic skin response (GSR—sweating), blood pressure (sphygniomauucter) mid operator body and body-parts position (accelerometers), and other measurements as: sound, vibration, electric and magnetic fields, temperature, light, in a modular structure used depending on local needs and requirements.

environment parameters is referred to external to operator as air temperature, heat index, barometric pressure, relative humidity, radiation on various spectral intervals as radio, microwave, infrared, visible, ultraviolet, x and gamma, as well as electric and magnetic fields (compass), sound and vibration and their directions Headset—refers to virtual or augmented reality headset or helmet, which is a specialized, head-mounted display device that provides a simulated visual environment through physical display optic lenses, allowing the user to see both a digital display and/or the world through the glasses, which will be upgraded with supplementary equipment to meet our requirements.

COMSOL Multiphysics® is a general-purpose software platform, based on advanced numerical methods, for modeling and simulating physics-based problems.

Finite element analysis (FEA) is a computerized method for predicting how a product reacts to real-world forces, vibration, heat, fluid flow, and other physical effects. Finite element analysis shows whether a product will break, wear out, or work the way it was designed.

fluid dynamics is a sub-discipline of fluid mechanics that deals with fluid flow—the natural science of fluids (liquids and gases) in motion. It has several sub-disciplines itself, including aerodynamics (the study of air and other gases in motion) and hydrodynamics (the study of liquids in motion)

Robotics is the branch of mechanical engineering, electrical engineering and computer science that deals with the design, construction, operation, and application of robots, as well as computer systems for their control, sensory feedback, and information processing CAD—Computer-aided design (CAD) is the use of computer programs to create two- or three-dimensional (2D or 3D) graphical representations of physical objects. CAD software may be specialized for specific applications.

real-time—is understood as the actual time in which a physical process under computer study or control occurs, or a time required for a computer to solve a problem, measured from the time data are fed in to the time a solution is received, where timing or arrangement is allowing a process, to occur normally, as without delay or asynchronous, in simple words, is a relative time interval that allows a control system enough time to control a process efficiently.

SUMMARY OF THE INVENTION

The present invention is about a method to increase awareness of the operators that control an industrial process by providing them a high quality immersive augmented reality system that collects data from the instrumentation they have, and transforms it into images with color, pulsation, and applies over the image of the desired equipment generated by a computer acquired design after equipment's blueprints, or over the image transmitted from a fixed or mobile camera. When camera is mobile, carried by a flying or surface robotic system, or human operator, it may have supplementary measurement capabilities. The system is able to add them on the measured part, complementary to the instrumentation already in place. A data acquisition system is connected with the existent control room equipment in a non-invasive manner, and collects the data the operator sees on various panels and displays, and transmits it to a supercomputer that is doing, real-time data integration. This system does not change the control room, but adds to it, improving operator's real time awareness on process they control, helping them make optimum decisions.

This system also collects and augments the communication system, integrating images from all surveillance and technologic cameras, as well from all sensors in the surroundings of the reactor, prioritizing it.

A 3D schematic of the equipment is generated using the building and equipment design files. The indications are placed on each device and the corresponding data from near-by instrumentation is added in a friendly graphic representation, The operator may visualize the process on a flat screen stereoscopic imager or in a pair of stereoscopic display goggles, having the capability to host several operators in parallel looking at various devices and modules with capability of zooming-in and generating detailed explanations. Supplementary, simulations from codes developed, will be added, if allowed, using the instrumentation data, to generate the particular simulations and to benchmark it.

The main images generated by the system will be related to the normality of operation, inside safety limits and designed performance parameters that may also be acquired from history/data log of the previous operations. The computer will compare the actual parameters correlation with those from previous operations, and highlights the discrepancies.

At user's, or operator's request it can produce a 3D global view of the whole assembly, in color code signaling with blinking colors the areas with irregularities, as having mal-operation or different than previously observed operation. Simulation codes develop predictive maneuvers, calculating the effects of any possible change, using it as advice for the operator. It uses a simulation code based on adaptive learning, by monitoring previous operation parameters, forming databases and deducing potential inter-correlations, which are further used to make guesses and compare with what has been obtained improving the predictions, as it goes.

It may generate several types of images as the on/off equipment map, localize an equipment by request, for example: "Where is the pressure release safety valve?", a piece of important information in Fukushima's case, where it took a flock of operators several hours to find and actuate it, with minimal success.

It may generate charts showing the evolution of various parameters, and may generate images showing where and how to localize the mal-functioning equipment.

This equipment may be added to the actual power plants, with a minimum investment, helping to navigate the reactor towards high efficiency and higher safety, integrating in customized applications all the accumulated knowledge, and using as platform for further simulation development. Other control units from chemical and reprocessing industry may also benefit using this equipment. Communication inside the control room and with external workers was among first to fail in the case of Three Miles Island and Chernobyl, therefore the present system provides assisted communication and direct access online to operation data, in conditions of internet secure applications.

The system is conceived having disaster in mind, and it is designed to be robust and monitor itself for integrity using redundancy as an embedded feature.

In this concept, human factor is important and human decisions may seal the fate of an equipment and sometimes of the entire surrounding area, and that is why monitoring that operating crew is safe and sound is an important function. The head sets are not simple augmented reality devices, as those on the market now, but they acquire and transmit in real time the biometric parameters of operators, in a modular approach, starting from vitals, to more elaborated functions as electro-graphs of various functions of the body as hart, brain, muscles.

It also records in each location the surrounding environment data, from all-around sound and image, to temperature, weather data and other added parameters in case sensitive mode as radiation, gas composition as leaked gases for toxicity or explosive atmospheres, and various object recognition in case of drastic changes in the plant environment as after disasters or terrorist acts, features supposed to allow operators to proceed safely with the process to the nearest safe regime.

The system is a modular open system, and any supplementary required function may be added, or its complexity may be reduced to a minimum necessary.

FIGURES DETAILS

Figure 1:
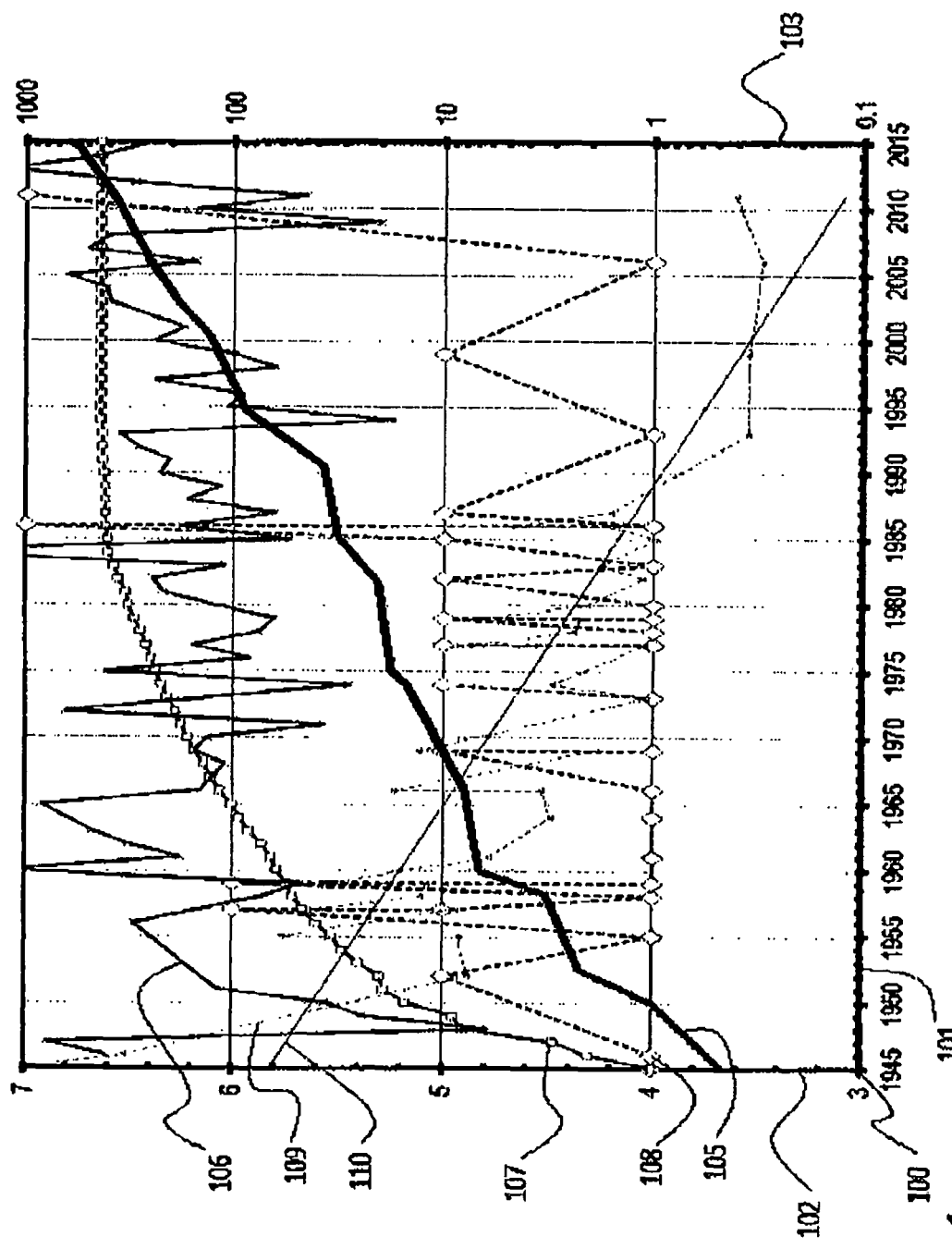
FIG. 1 is a view of the nuclear accidents compared with commercial aviation causalities.

FIG. 1—is a view of the major accidents compared with nuclear accidents and commercial aviation causalities;
100—Chart representing the growth in industrial processes and accidents as function of time;
101—Timeline, Year;
102—Ordinate with values for various functions in linear scale—left scale;
103—Ordinate in logarithmic scale-right scale;
105—The evolution of number of various technologic processes that needs to be controlled in [thousands units] read on right scale;
106-Number of death per year in various industrial major accidents [thousands] on the left scale;
107—Number of nuclear power reactors [units] on right scale;
108—Nuclear accident INES level on the left scale;
109—Calculated probability of accident function normalized at 1000 units, read on the right scale;
110—Trend function line for the probability of nuclear accident read on the right scale.

Figure 2:
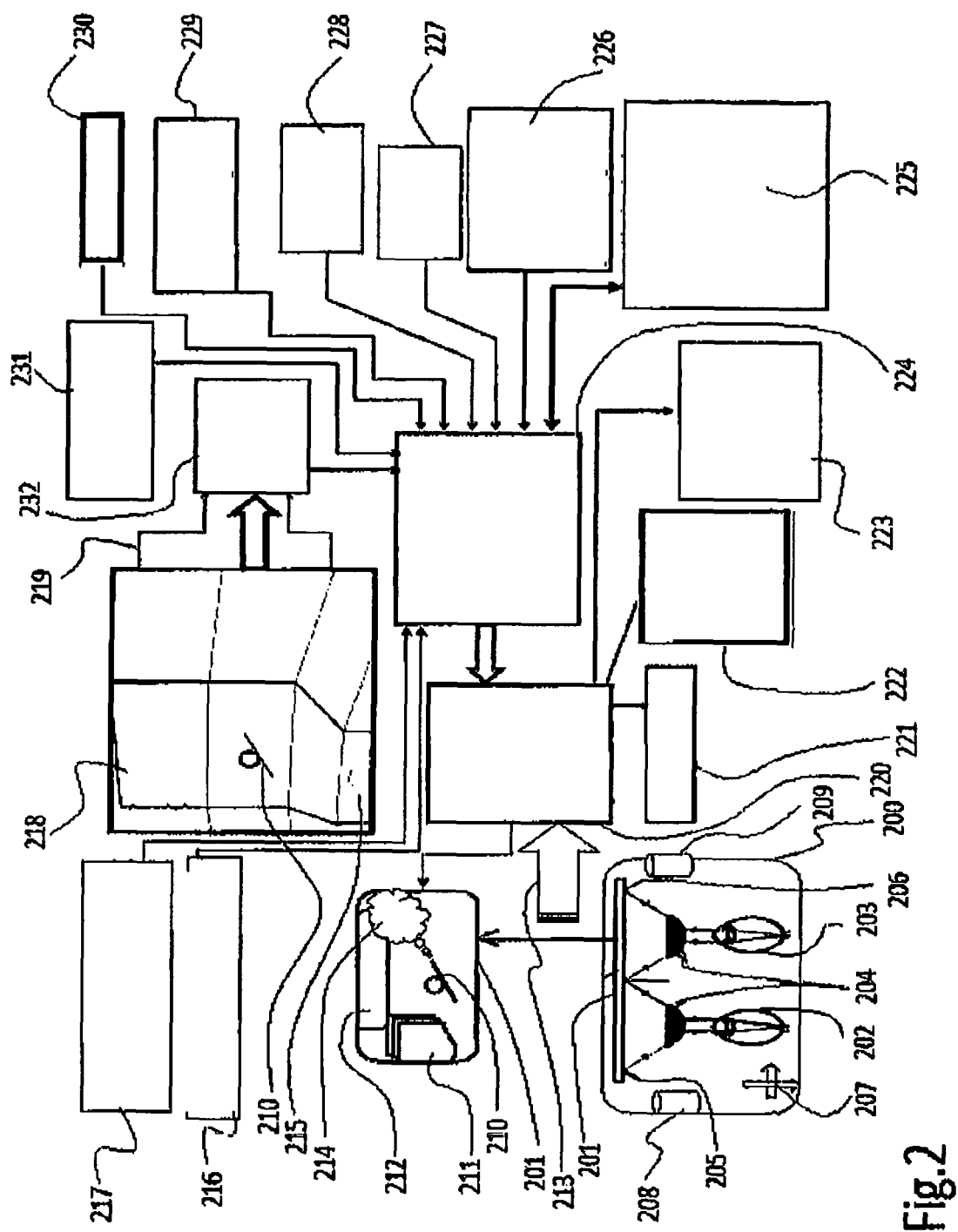
FIG. 2 shows an augmented and virtual reality, 3D immersive visualization plant's control device.
Figure 3:
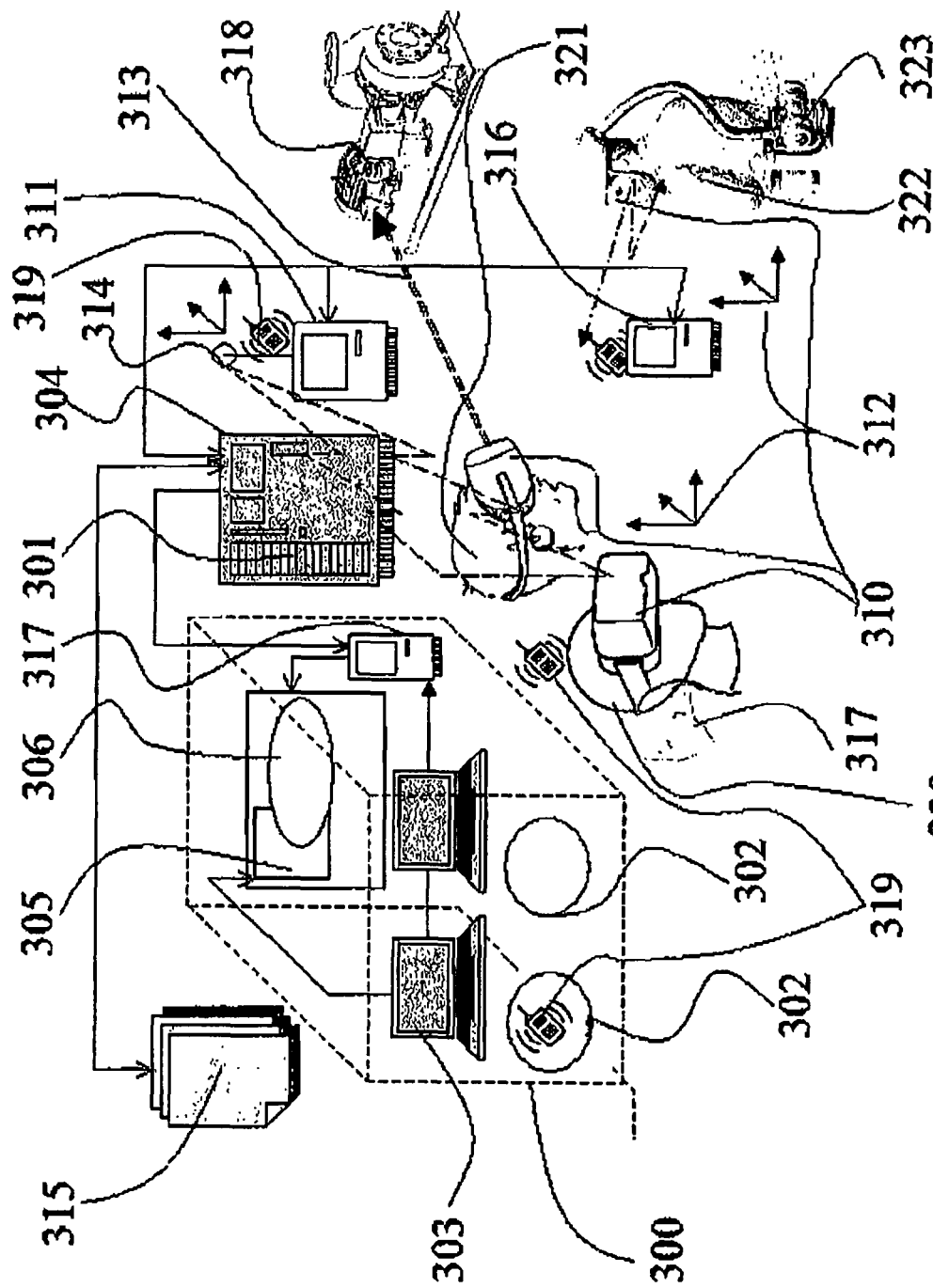
FIG. 3 shows the schematics of networking and communication system for distributed Augmented Reality with fixed and mobile Virtual reality devices and infrastructure FIG. 4 details how an augmented reality mobile device on operator on move recalibrates using a control panel at an entry port when operator goes inside controlled infrastructure with restricted communication FIG. 5 describes a mobile operator bio-parameter monitoring system that is distributed on operator's body, FIG. 6 gives details on mobile operator environment monitoring system FIG. 7 describes an operational situation, with 3 rooms, where the wireless communication has limited propagation
Figure 4:
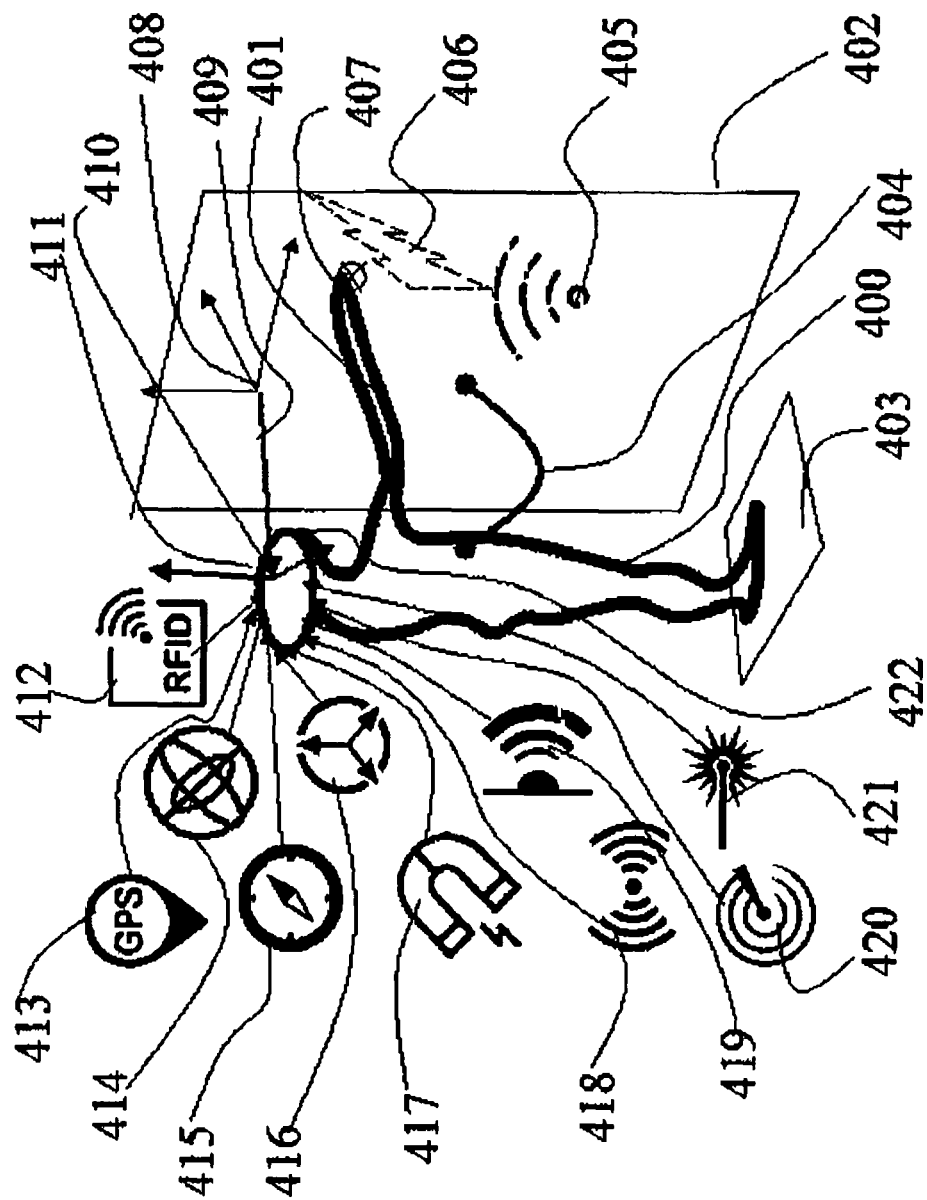
Figure 5:
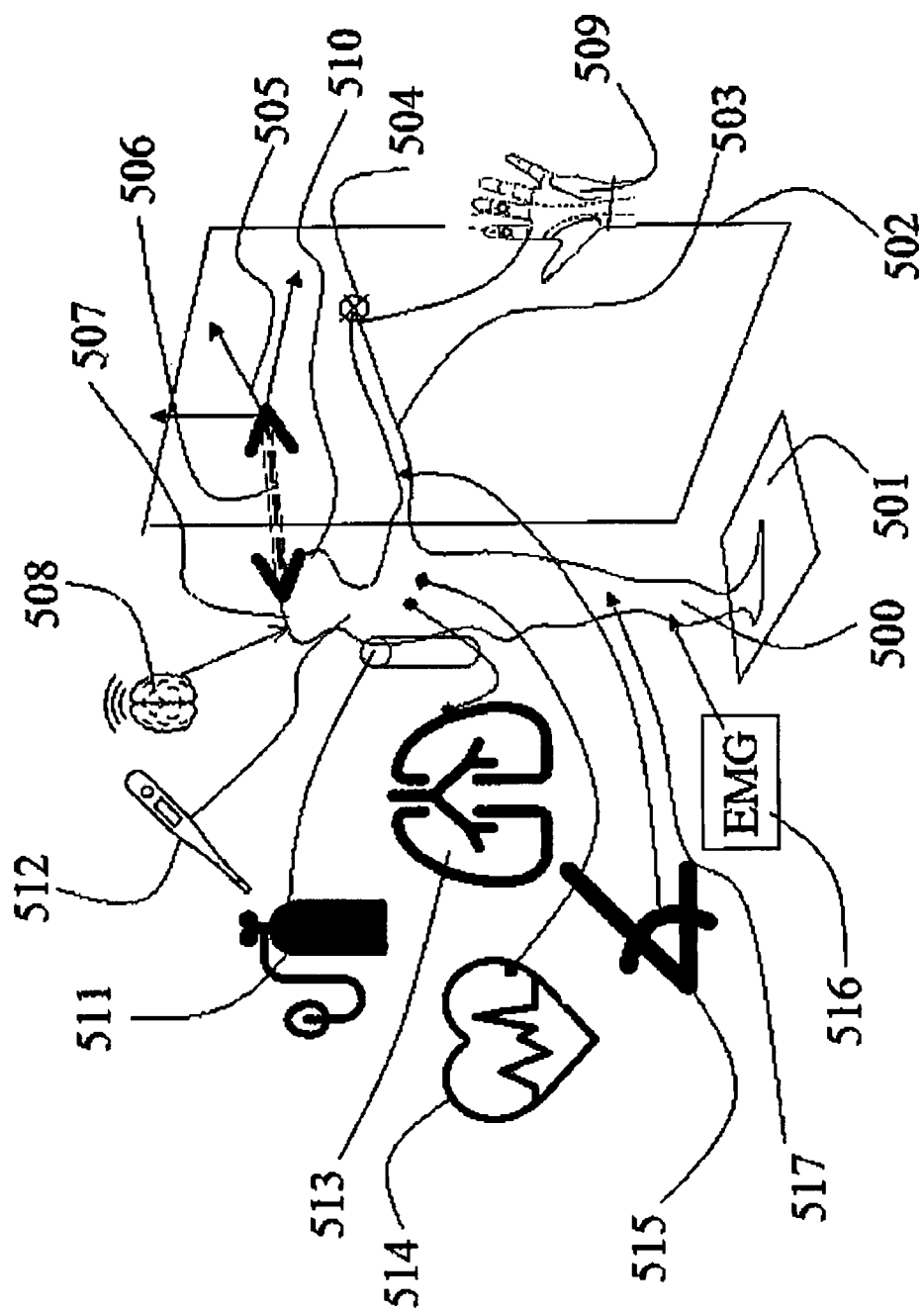

FIG. 2—Augmented reality 3D immersive visualization system block diagram and control device.
200—Augmented reality headset;
201—Display;
202—Left eye;
203—Right Eye;
204—Lenses;
205—Left image;
206—Right image;
207—Localization, attitude device (gyro-accelerometer-compass circuit);
208—Left imager (camera, LIDAR, sonar);
209—Right imager (camera, LIDAR, sonar);
210—Object of interest;
211—Augmented reality scenes—details;
212—Menu option bar for augmented reality;
213—Pointing or other operator communication with compute device;
214—Cloud —computer Wi-Fi communication;
215—Operator's position in front of control panel or instrument;
216—Operator bio-parameter monitoring sub-system;
217—Operator's environment parameters monitoring sub-system;
218—Control room;
219—Data bus;
220—Virtual and augmented reality plant's visualization and control sub-system;
221—Overall view of the plant operation;
222—Detailed view of various controlled processes;
223—Holistic view of plant connected to grid and environment;
224—Computer system integrating data, simulation, and specialized visualization requests;
225—Simulation of various processes and equipment operation in plant to augment current measurements;
226—Memory of operating parameters in the previous regimes;
227—Simulating system using previous operating regime data;
228—Instrument positions log, in plant's coordinates;
229—Building and installation plans;
230—Integrated, redundant communication sub-system;
231—Image, sound, vibration monitoring sub-system;
232—Data acquisition and processing sub-system;

FIG. 3 shows the schematics of networking and communication system for distributed Augmented Reality with fixed and mobile Virtual reality devices and infrastructure
300—virtual reality visualization enclosure;
301—Computer producing VR images, triggered by operator's request for analysis;

302—operator team members;
303—VR terminal, specialized computer;
304—process monitoring system, computer system;
305—current visualization session;
306—emergency interruption generated by the process computer;
310—augmented reality mobile devices;
311 internal location coordinates system, specialized computer;
312—operators' location;
313—operator's headset line of sight;
314—communication with computer devices;
315—computer database that is storing and processing previous operation history;
316—process and instrument database specialized computer;
317—operator menu selection mode and simulation computing system;
318—example of instrument generating process data object of interest;
319—redundant communication system;
320—operator team members;
321—operator team members;
322—operator team members;
323—operator biometric parameters and surrounding environmental parameters measuring sub-system and hazardous conditions life support;

FIG. 4 details how an augmented reality mobile device on operator on move recalibrates using a control panel at an entry port when operator goes inside controlled infrastructure with restricted communication
400—operator;
401—operator's arm
402—access area, entry location/calibration system
403—room/area's coordinate system fixed reference operator's pad
404—cable/wire connection
405—wi-fi/radio connection
406—IR connection
407—calibration mode button
408—area's coordinate sistem's fixed reference
409—operator's location vector in area's coordinate system
410—operators head/helmet coordinate system
411—augmented reality mobile device, headset (310 in FIG. 3)
412—RFID
413—GPS
414—3 axis gyroscope
415—3 direction inclinometers
416—3 directions accelerometers
417—3 direction magnetometers
418—EM spectrum analyzer/receiver
419—ultrasound distance measurement/ultrasound locator (proximity sonar)
420—Radar
421—Lidar and as a telemetry detector as radar, laser detector
422—stereoscopic camera in various bands as visible, filtered, IR-night vision or IR-thermo-vision, placed on operator FIG. 5 describes a mobile operator bio-parameter monitoring system that is distributed on operator's body
500—mobile (with AR headset) operator;
501—fixed reference area pad;
502—in front of the entry wall;
503—operator's arm;
504—reference coordinates calibration button;
505—room reference system of coordinates;
506—location vector relative to area coordinate system;
507—augmented reality headset;
508—EEG measurement;
509—a skin conductivity measurement;
510—Oxygen level measurement;
511 breathing gas/life support;
512—temperature measurement devices;
513—measuring Breathing rate;
514—a pulse rate/EKG;
515—position of body components measurement;
516—EMG measurement;
517—pH measurement.

Figure 6:
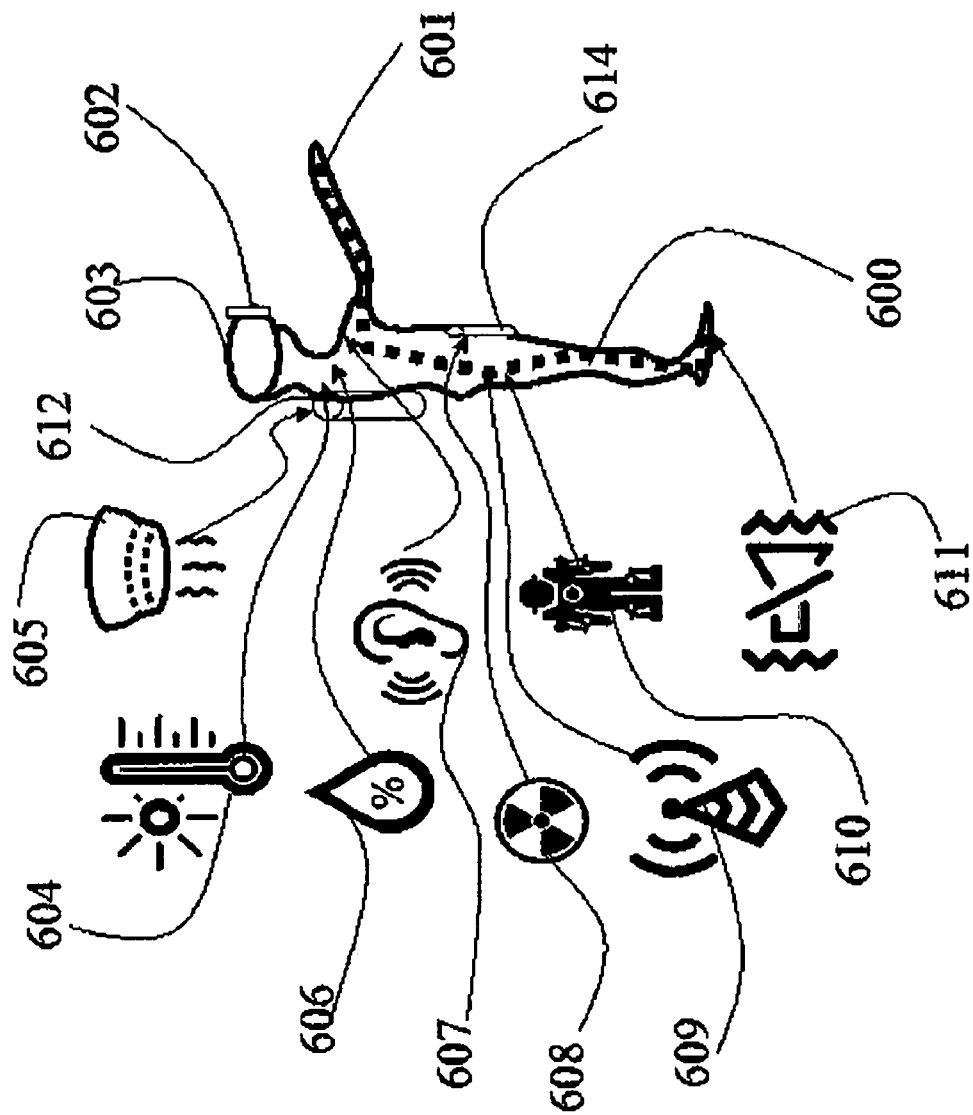
Figure 7:
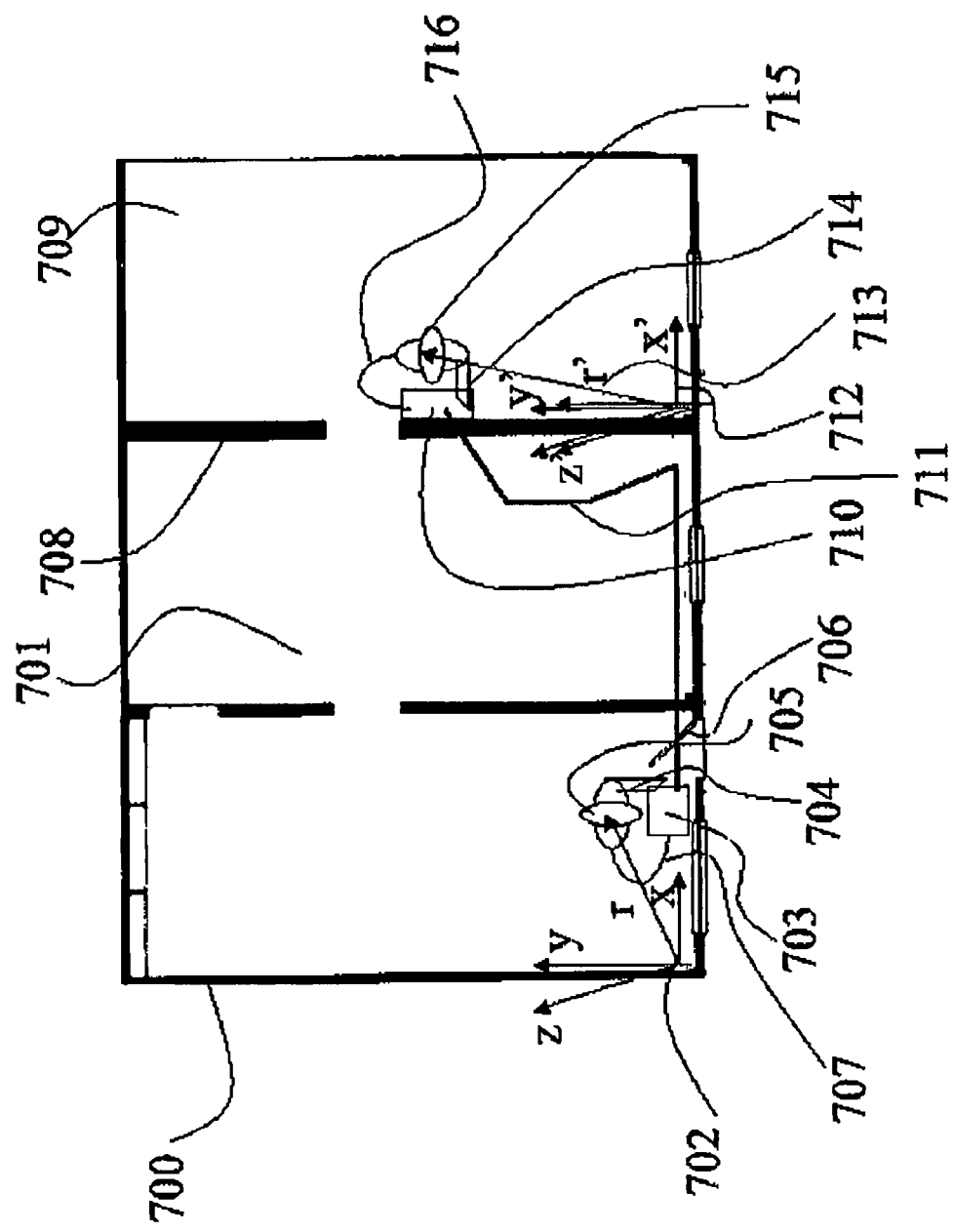
Figure 8:
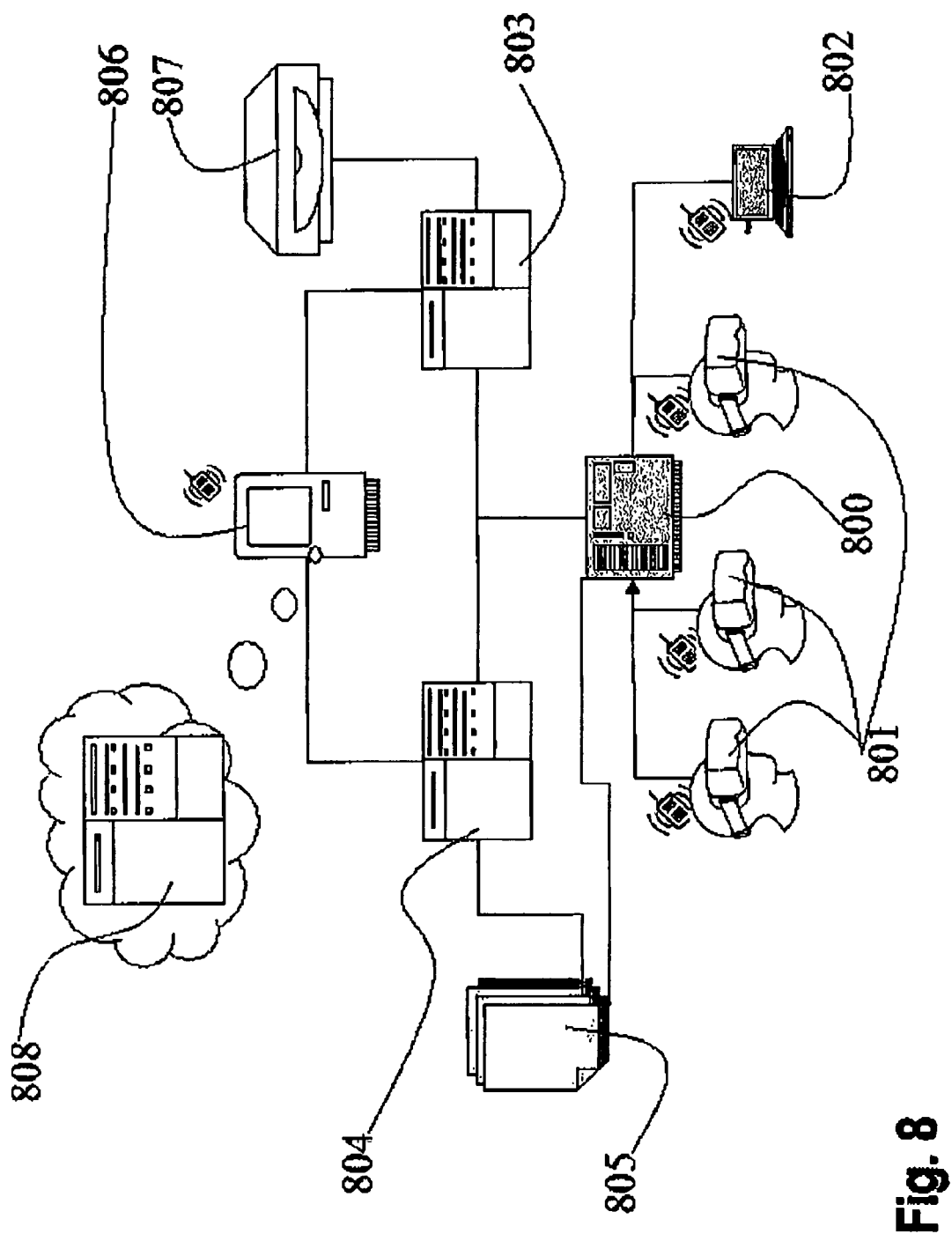
FIG. 8 shows a computer system controlling the information flow with each headset and operator system using plant and cloud computers.

FIG. 6 gives details on mobile operator environment monitoring system 600 mobile operator;
601—Operator's hand;
602—pointing system and communication interface at operator choice, as joystick, eye tracker, as part of augmented reality gear, including voice recognition.
603—Operator headset
604—external temperature field sensors;
605—multi-gas monitoring sensor;
606—humidity sensor,
607—sound surround monitoring sensors;
608—radiation type and level measurement;
609—EM spectrum monitoring;
610—Exo-skeleton control parameters;
611—vibration monitoring sensors;
612—supplementary life support gear parameters monitoring for air or oxygen pressure, temperature, humidity;
614—hazmat suit including power supply control parameters for assisted heating or actuators;

FIG. 7 describes an operational situation, with 3 rooms, where the wireless communication has limited propagation
700—first room;
701—second, adjacent room
702—first room's coordinate system,
703—entry location system
704—operator's hand touching calibration button
705—operator in first room
706—door of first room
707—direct communication cable
708—shielding/obstructing wall that negatively affects communication from near by first room
709—third room with no coverage from the first two rooms
710—coordinate calibration entry point in other room
711—network connection wire
712—coordinate reference system in third room
713—operator's position vector in another room
714—operator's hand touching calibration button
715—operator in another room
716—direct communication cable FIG. 8 shows a computer system controlling the information flow with each headset and operator system using plant and cloud computers.
800—computer system controlling the information flow to operators
801—headset with augmented reality display
802—operator system
803—multiple use plant's computers
804—multiple use plant's computers 805—multiple use plant's computers
806—communication system of computers
807—data acquisition sub-system
808—computer cluster holding data base

DETAILED DESCRIPTION OF THE INVENTION

The inventors consider the developments in wearable electronics and of 3D virtual and augmented reality devices as well the successes in modeling the industrial processes down to minor details. It also takes into consideration the fact that most of the actual developments in virtual reality and augmented reality require a large computing power, and may not be useful for operators that have to make split-second decisions, being more useful for finding the optimum-optimorum of a steady process than of a fast transitory one. The experience of CASL-VERA developments, in nuclear power plant control, showed that in spite these visualizations are high-quality, high detail, it requires a super-computer to obtain them, may not be available in real time, or clear enough when needed, and a database with simple equipment behavior extrapolations is desired as a first resource and for redundancy reasons.

It will come as a requirement or recommendation, to develop redundant communication systems as well as redundant power supply systems in order to be able to maintain a holistic knowledge and process control functions as long as possible during high severity events, or disasters, making the control process bring no contribution or to increase the impact factor, by aggravating the consequences/outcome of an accident or malfunction.

Having in mind that this system have to be operational in crisis time, that the ambient where augmented reality devices work, might not be always nice and cozy the headset devices have operator and operator environment monitoring features as well as locating capabilities, specifically designed for industrial environment where satellite or cell phone, GPS might not work, radio communication may be affected by the structure of building and equipment in the same way a Bluetooth or Wi Fi is affected inside homes, each plant will have its own, redundant communication system, from, wire, optical to wireless.

2. Best Mode of the Invention

FIG. 2 shows the devices in of the best mode contemplated by the inventors of the use of a data acquisition and processing system. Its accessories devices according to the requirements are presented in FIG. 2 with some solutions and developments that are embedded in the present invention.

The invention corrects previous deficiencies of the complex process monitoring and control devices, which are bulky, hard to correlate, distributed in terrain and in control room, improving their performances with respect to the usefulness of the data, as follows;
a)—Improves the usefulness and comfort of the bearing an augmented reality equipment, connected via WiFi to a system of distributed emitter receiver hubs, that assures a strong audio and visual communication among the crew members from peer to peer and hierarchically, that may be baked-up by IR and wire communication;
b)—Makes a system that warns operator when something runs out of range and is about to take an action, as a result of an undesired evolution of the controlled process, aided by simulating capabilities, and embedded "expert functions" in the computer system;
c)—Is easy, upgradeable being modular in structure, and having a virtual reality control room (one or several) upon the needs, and several augmented reality devices as wearables on operators;
d)—Has a ultra light sensor applicator on operator's body structure, easy removable, and with self-control of good operation, transmitting also operator's bio-parameters related to operator's state of wellbeing;
e)—Is redundant, in order to provide needed data, in the most difficult circumstances, as an accident, nuclear or classical, triggered by adverse nature actions or by flaws embedded in technology, operating in distressed areas.
f)—Is developed in various functional approaches, from the threshold detection to anticipation, with different complexities and redundancy level, in agreement with the necessity, being more complex for a nuclear power plant than for a brewery;
g) Improves the warning and alert to the operator, by early detecting any anomalous evolution, based on customized data sets of the same system previously operating.

Best application of the invention is explained in FIG. 2, but it is not limited to specific application presented and there are also some applications that do not require such complex equipment, and a simplified version is possible to be used, and gradually upgraded. It may start with versions that does not anticipates the critical moments based on advanced simulation on supercomputers, that may bring the maximum efficiency to a operator minimizing his run outside the normal parameters.

3. How to Make the Invention

As one can see from the drawings this method and procedure includes a device that is conceived to prevent the most complex accidents actually known in industrial plants, being usable in any other process control unit, being a powerful information unit, helping the operation crew keep the plant safe and on its optimum.

The application of this system does not require any modification to the actual controls and procedure, and it is simply added over the existent process control system.

It is made of an optimized data acquisition that transmits the data to a computer that calculates the evolution, with anticipation, predicting the best regimes, or in the case when something bad seems to happen, it warns operators, making them aware on the issue and potential option to dodge a bad outcome.

The virtual reality enclosure, 220, is built with the purpose of the project is to have at least one person look inside all of the structure as in a doll house similar to a supervisor, using various visualization functions. That to have all of the operating details necessary for explanation for any instrument or module component of a control box and results of complex simulations that may predict the status and future evolution of the controlled process (reactor power plant) on mobile augmented reality devices.

Therefore all operators will be connected, and act all like one, in perfect coordination.

A high capability computing system, 224, is in charge with presentation of the entire information for operators, supervisors and approved external, remote links, where customized augmented reality is transmitted to user's visualization device, generally that is prepared by a super-computer that integrates a large variety of data with simulation.

This computing system will generate an overall view, 221, of the entire power plant in 3D semi-transparent view, or 2D images, being case sensitive, making the supervisor and operators aware of the way the system is operating and may highlight issues where something is not operating or working right or an abnormal behavior is obtained with respect to previous good and safe operations.

A high importance and attention have to be given to the process core, 222, where the operating is complicated by the fact that one has to understand processes inside the core and foresee the effect of touching any control button.

A great support, in the case of a nuclear power plant may be provided by the progress made in the nuclear reactor simulation research and results of CASL (Consortium for Advanced Simulation of Light Water Reactors founded by DOE in 2010), 225, initiative that may allow a supercomputer to predict the effect of any change in control system, or temperature, and composition of materials inside the reactor core. Similar simulations are available for classical power plants, boiler, furnaces, chemical reactors, etc. that may be integrated in order to enhance the information supplied to human or automatic operators.

Any controlled process of some importance to us (say a nuclear or cogeneration power plant) is not an insulated system, 206, that works alone, but it is connected to electricity grid where it delivers its electric production and/or takes power for its operation and is also connected to water sources and is influenced by weather and other events (social unrest, security, equipment malfunction etc.). That is why a holistic real-time knowledge for operators, have to consider all these factors and it is good to have everything accumulated and integrated.

A database containing records of parameter evolution during previous operation, 226, is very useful information rendering function of all instruments and modules where a prediction for a future regime may be obtained from memory of operating parameters in the previous regimes. The device will take previous history of parameters and compare with the current parameters, if something is different, it will make the operator aware of a possible issue/or problem.

A distinct, redundant module, 227, takes previous history records from database, 226, and compiles them into possible events in the future. This system may work autonomously from computer that is providing data to supervisor. A simple case may be that related to reliability issue, pre-failure symptoms and lessons learned, that are taken from the database and translated into future events with pre-warning signals and explanations.

The augmented and virtual reality systems, 228, is using design local plant's plans, blueprints, 229, and compiles them into a type of 3D map in order to accurately know where everything is located, how it looks like, what is it function and more, in order to be used to augment the reality of the mobile operators looking for that object, or to create a virtual reality. Here we will not describe all the functions this hybridization may provide, but is desired that any information an operator on spot needs to know, to be available at that instance. An example of information may be provided is Instrument optical recognition, instrument bar code identification or RFID reading, what instrument is doing, where is connected, its cabling to the transducer, its electronic and mechanical design, date of last revision, what computer predicts the reading should be compared to its actual reading, limits of operation, record of possible incidents with similar instruments, repairing or control procedures, etc.

Communication and synchronization among team members is a critical issue, especially in distressed systems. A well-defined communication structure, 230, that allows real-time communication among team members distributed across the building to provide them with all necessary information or data for their augmented reality, and operation is vital for the well-being of a controlled process or installation. In the nuclear accidents history that was sometimes the trigger of an escalation of the accident status from bad to worse. It is known that inside industrial buildings communication does not work as in plain field, and special care has to be taken to deploy the right communication system. The handset will be provided with optic and electric cables to connect in various ports, in case of jamming, and Wi Fi and IR wireless communication. Headset location system will use building coordinates, and local references and calibration instead of generally used coordinates as OPS. Hierarchically structured communication, with liaison points, or peer to peer, or all simultaneously will be implemented as a function of circumstances.

Image, sound and vibration recording and interpretation system, 231, is important. Receiving images would allow the operator to see presence in various areas and temperature distributions on various modules using infrared thermo-vision cameras. Night-vision on headsets will be an important feature, making the crew able to safely operate during blackouts. Sound and vibration would allow the operator to hear if a pump is malfunctioning or to detect any abnormal noise in the system, and localize its origin. Headsets will transmit their sound and image information to computer analyzer that will extract the background noise and search for abnormal noise, or background modifications, and make operators aware.

Data acquisition, 232, is not a trivial task inside a power plant or other process, in spite modern equipment have these indications digital and present in various control units, bringing all data in real time into a single machine still remains a challenge. No matter the generation of the control room, a supplementary data acquisition system would collect all the values of the instruments and submit to the supercomputer unit in order to use them to create augmented reality. The installation may also be used to benchmark various simulation codes, because these codes may have available same inputs and their predictions have to be compatible with measurements, or the differences will be valuable indicators on what is missing or malfunctioning inside a code.

Control room, 213, no matter the generation of construction and type of instrumentation, will be preserved. This system and associated devices are not intended to replace control room, replace or augment its functions, or change the operating procedures. Procedures would remain as usual except supplementary level of knowledge and coordination will be introduced that may guide the operators with the augmented reality attached on their displays or vision devices (a type of Google Glass) Operator positions, 215, will remain same, will have to do same procedure will only difference is that operators are now more aware of the status of the plant and the effect of adjustments, wearing augmented reality device when needed.

in its simplest version presented in FIG. 2, the system is at its minimal level, when advanced simulation software unit is missing, predictions for the future evolution being made only based on database and lessons learned.

In order to make the invention, one have to add the virtual and augmented reality system, as presented in FIG. 2 and customize it for the specific process intended to be controlled, introducing inside data base all the necessary details, enhance the instrumentation, communication and localizing system at the level of hazard anticipated, test it and provide necessary training to operators.

DETAILED DESCRIPTION OF THE FIGURES

The technologic processes control systems have a very large diversity, and an augmented reality control system have to be customized for each process, such as even an unexperienced operator to be able to safely control the process and drive the equipment to a safe rest, and face the most difficult challenges that usually cripples the equipment ending in an accident. But, the major gains of application of this device are coming from normal operation, where it helps operators maintain the process on its optimal range all the time, detect in advance potential failure and schedule optimal maintenance.

FIG. 1—is showing a plot of the accident data in industry and nuclear power, from where we learned something and this idea was triggered, giving a brief view of the major industrial accidents compared with nuclear accidents, where we have compared the number of fatalities from general industry accidents with the INES (International Nuclear Event Severity scale) level associated to nuclear power plants accidents, using a chart, 100, representing the growth in industrial processes and accidents as function of time. In fact, nuclear power plants are very few, 439 operating now on the entire world, they are not really our main customer, but they have very well documented accidents, compared with the industry where the fuzziness and cover-ups makes it hard to understand the magnitude, real causes and triggers.

On abscises we represented time line, 101, of the events in years, and we have used two ordinates, one linear, 102, ordinate, on left side, with values for various functions including INES (International Nuclear Event Severity Scale), industrial accidents fatalities are represented in linear scale on the left side.

On the right side we plotted values on a multiscale, 103, an ordinate in logarithmic scale ranging from 0.1 up to 1,000.

We have learned from, well documented nuclear accidents, 108, but the product is designed to address a multitude of process control units, and an estimative curve showing evolution of number of various technologic processes, 105, that needs to be controlled in thousands units read on right scale, 103, is given. These processes included in this curve, deliver an annual rate of accidents by several orders of magnitude over the nuclear accidents, and number of death per year in various industrial major accidents, 106, readable in thousands, on the left scale.

Number of nuclear power reactors, 107, in units, readable on right logarithmic scale, shows the evolution of nuclear power over time, from 1945 to present Nuclear accident INES level on the left scale, 108, and was used to calculate probability of accident 109, as a function of year it took place, normalized at 1000 units, read on the right logarithmic scale. Because this probability came out as a zigzag line, due to poor statistics, a trend line, 110, for the probability of nuclear accident function, 108, read also on the right logarithmic scale, 103 was given.

Basically, this figure, shows the motivational background of our invention, simply to reduce number of accidents and to reduce their severity, and we intend to address the industrial and other technologic accidents, by a better human machine interface, that to increase operator's and crew's awareness on the process they control, in real time, with maximum available and necessary details in real time, in order to reduce with at least a half the actual accident rate. By developing this method and system we involuntarily reached another milestone, even more profitable, that consists in the capability of operators to place their equipment on the maximum efficiency, and better schedule maintenance sessions.

FIG. 2 shows a schematic diagram of an augmented reality 3D immersive visualization control method and system meant to increase operators' awareness on the process they control being the main embodiment of our invention. The system contains a plurality of augmented reality headsets, 200, that have a high resolution display, 201, with two sections, seen distinctly one by the left eye, 202, and one by the right eye, 203, using a set of lenses, 204, in order to accommodate for distance and field of view. As shown in the state of the art section, there is an intense activity in developing these devices mainly for gaming and common user applications, and the headset itself is not an object of our invention, because we will use some from the current production which ones that will better fits our needs, and cost, but as a courtesy to those who will use our invention we described a little bit how theses stereoscopic imaging system works. An embodiment of our invention is the enhancement we provide to the headsets to become compliant with our needs for operator end data acquisition, with respect to accurate, redundant and robust localization and communication, operator bio-parameters and operator's current environment data collection and dissemination.

No matter if the system is using an anaglyph, or shutters, polarizers, holograms, it will create a left image, 205, and a right image, 206, which operator's brain will process and have the 3D vision perception.

To the actual device, as an embodiment to our invention, we will come with accurate inside buildings localization, and attitude device, 207, containing a 3-gyro-accelerometer-compass and inclinometer circuit, intended to produce very high localization accuracy, and in order to produce for the computing sub-system and other users good data, it will also contain a left imager, 208, and a right imager, 209, containing imaging cameras in visible, with filters and polarizers, illuminating devices, IR or UV, a set of LIDAR, radar and sonar scanners, 210, deployed based on need, used to give a clear, accurate localization, of an object of interest.

Location sub-system on headset comprising may also have attached an ultrasound distance measurement device, or a scanned ultrasound locator (proximity sonar), useful in hazardous low visibility circumstances, a tunable Lidar, able to visualize various gases, a proximity radar device, and in hazardous open areas as war zones, a telemetry detector as radar, laser beam exposure detector might be useful, in order to become collective knowledge and be used by the augmented reality system to identify the object, its status and environment, for the best real time information menus. This system is conceived to be disaster proof system, and operate not only in nice rooms, but in disaster affected installations. The problem is that disaster compatible mobile equipment is more expensive and difficult to wear, than light headsets designed to operate in laboratory or room environment, and there is no good solution to this problem. Our opinion is that at least one of the mobile sets has to be equipped with all hazard proof equipment based on level of severity anticipated by the designer or installation owners.

Augmented reality scenes, 211, ideographically presented in FIG. 2, is meant to give reader some details on how a mobile, operator level device works, where operator may have available a menu option bar for augmented reality, 212, that activated may download from, a cloud, 214, that may be any specialized computer or computer cluster, via local Wi-Fi, IR or cable communication, the desired data, to be put on screen. Operator communicates with computer via a pointing or other operator communication with compute device, 213, that can be a mouse, glove, positioning system eye tracking and EEG detector, EMG detector which by thought or muscle electric activation may perform functions as selection, mouse over or mouse click. It is not an embodiment of our invention, there are plenty of devices on market and we may pick and choose which one seems more fit for the task.

Of course, an operator may have a position in front of control panel or instrument, 215, or may be anywhere in the installation, and that have to make no difference in the quality and accuracy of data he receives and transmits.

In almost all the cases, we desire that operators to be out of any influence, to be healthy and sound, and sober, therefore we need to continuously know operator bio-parameters, by using a monitoring sub-system, 216, and to know operator's environment parameters, by using a monitoring sub-system, 217, no matter if operator is inside control room, 218, or somewhere in the plant, all that data have to be transmitted via data bus, 219, and be delivered to all sub-systems in real time. The interest for knowing operator biometric parameters comes from the fact that in many cases the responsibility for the fate of a region, is in the hand of very few in charge with control of a very sensitive process, and is good to know that in any moment they are up to the job. Operator bio-parameter monitoring system comprises a pulse rate-oximeter, temperature, breathing rate, to see if the vitals are working right, in the particular range of the known operator. Skin conductivity and pH, as well electric functions as EEG, EKG, EMG, are needed to assure that operator mental state is appropriate with the operations, is not sleepy or have other concerns and preoccupations that may distract him from job. In special cases breathing content of carbon dioxide, oxygen, water and alcohols vapors and body odors may be monitored. Anomalies detected will trigger a warning to operating crew leaders and require a permission to operate and an explanation, eventually a physician report. Position of body components might be a supplementary measurement, especially when operator is in hazardous environment protective suits, and is associated with mobile environment monitoring subsystem and headset info.

Mobile operator environment monitoring system has temperature sensors, relative or absolute humidity sensor, multi-gas monitoring for area with toxic or explosive gas leak hazards, sound and vibration monitoring of surround area, radiation type and level measurement for radiation hazard environments, or EM spectrum monitoring.

Mobile operator may supplementary have life support gear as hazmat full protection suit with parameters monitoring capability for air or oxygen pressure, temperature, humidity, external temperature field on hazmat suit, local power supply control parameters for assisted heating or actuators, and/or exoskeleton control parameters.

The virtual reality enclosure 220 is built with the purpose of the project is to have at least one person look inside all of the structure as in a doll house similar to a supervisor, using various visualization functions. That to have all of the operating details necessary for explanation for any instrument or module component of a control box and results of complex simulations that may predict the status and future evolution of the controlled process on mobile augmented reality devices.

Therefore all operators will be connected, and act all like one, in perfect coordination. A virtual and augmented reality plant's visualization and control sub-system, 220, will be used in parallel with current operation, by specialized, authorized operators, to gain a real-time overall view of the plant operation, 221, a detailed view of various controlled processes, 222, a holistic view of plant connected to grid and environment, 223, in order to bring operation regime of all equipment to optimum. This embodiment of present invention will bring most of the savings to pant owners, which will add to the gains from the probability of accident and accident severity level reduction.

A high capability computing system, 224, is in charge with presentation of the entire information for operators, supervisors and approved external, remote links, where customized augmented reality is transmitted to user's visualization device, generally that is prepared by a supercomputer that integrates a large variety of data with simulation This computer structure, call it cluster, supercomputer or microprocessor based device sub-system will integrate data, in order to generate simulation, and specialized visualization requests, 224, based on models and cutting edge simulations as for example the actual programs developed under CASL initiative, or ComSol simulations, Finite Element or Fluid Dynamics, Robotics or CAD using the real-time data generated by instrumentation to initiate calculations and benchmark them, producing virtual images of the process and states inside equipment, unavailable by direct measurement means.

This simulation of various processes and equipment operation, 225, in plant will be used to augment current measurements acquired and displayed by the system.

Another computing structure, will be used as a "Memory of operating parameters in the previous regimes", 226, complementary to the virtual reality simulation environment previously described. This is a learning system that accumulates data from various previous regimes, and identifies correlations between various parameter variations, trying to predict what might happen when one or more parameters are varying. This sub-system runs in parallel with simulation sub-system because it is simulating system using previous operating regime data, 227, and may run without interfering with equipment control system, its results have to be considered by operators to use in their actual control. The installation may also be used to benchmark various simulation codes, because these codes may have available same inputs and their predictions have to be compatible with measurements, or the differences will be valuable indicators on what is missing or malfunctioning inside a code.

During various event, operators need to know, where are located various instruments or pieces of equipment, as for example during Fukushima nuclear reactor power plant accident, it took more than 4 hours until the crew to locate and try to operate a pressure safety valve. In this case, the building and equipment plans will be put together in a 3D version of the digital plant, creating the so called instrument positions log, in plant's coordinates; 228. Some simulations of destruction, as enemy bombardment, earthquake, flooding may be performed in order to anticipate abnormal instrument positions, and potential associated hazards.

But, having building and installation plans, 229, only is not enough if these are not correlated with object identification and coordinate location system. This subsystem uses this information available to use guidance to operators and maintenance teams to locate and find instruments and pieces of equipment, get all data about them, from how that objects are used in the process to electronic and mechanical diagram, user manuals, repairing manuals, revisions and certifications, and other data form similar instruments. This subsystem may even coordinate and control a guided tour of visitors, detect unauthorized presence in various locations based on image recognition or RFID (Radio Frequency Identification Device) reading, or occurrence of unusual noise or images, related to presence of animals, intruders, displacements, overheating, etc.

In many accidents, the lack of a robust communication system, sealed the fate of that controlled process, therefore we are introducing an integrated, redundant communication system, 230, where mobile operators and those assigned to fix positions to be able to share real time complex information, and act all like a super-smart one.

Image, sound, vibration monitoring sub-system, 231, is in fact a distributed assembly of various receivers, placed in fixed locations, with acknowledged importance, mobile systems as operators' headsets, or robotic devices on surface and in air as drones, that work together and make a data fusion, providing an integrated image of the system, with triggers that make an instance or flag to pop up into assigned operator attention.

Data acquisition and processing sub-system, 232, is the core of the system, because it accumulates in real-time the data from all the instruments, and in parallel with the main display it delivers it to operators, and to simulation sub-systems. Data fusion, and data driven plant operation and control is important, and relies on this computer sub-system. All data sources, measurement instruments and other transducers, as cameras, and communication systems, have to be provided with redundant power and local backup, in order to prevent instrumentation blackout, similar to what happened during Fukushima, Daichi 4, tsunami flooding.

FIG. 3 shows how a method to increase industrial-process operators awareness on a controlled process and control equipment and infrastructure using augmented and virtual reality works using a virtual reality visualization enclosure, 300, where the images are produced by a Computer, 301, triggered by operator, 302, request for analysis, at a terminal, 303, or by emergencies, 306, generated by the process monitoring system, 304, which can interrupt or overlap in the current visualization session, 305.

A set of augmented reality mobile devices, 310, used in coordination with an internal location system, 311, that renders mobile operators augmented images based on operators' location, 312, and line of sight, 313.

Operator request for information or process simulation transmitted via communication with computer devices, 314.

A computer system, 304, that continuously acquires data from the process and compares with good operation margins obtained after storing and processing previous operation history, 315, and presents it to operator.

A process and instrument database, 316, that stores all the information related to equipment and infrastructure and processes, stores and renders it based on various criteria selected by operator, 317, or triggered by events computer 311.

A simulation computing system, 317, that uses theoretical formulas and instantaneous instrument data, 318, to guess the most probable state of various parameter distribution inside the equipment and check for good standing and optimum operation regimes.

A redundant communication system, 314, 319, design to assure instantaneous communication and data exchange among all the team members, 302, 320-322, based on a predefined need to know, or on-spot demands for information, as part of a personal communication set assigned to a person with multiple location calibration points, multiple connection capabilities, and event alerts in the system.

It describes an operator biometric parameters and surrounding environmental parameters measuring sub-system that also monitors his life support and hazardous conditions, 323, that takes the measured data in all the above mentioned sub-systems, 316, and, stores it in a data base, 315, of memory of operation parameters.

The line of sight, 313, or a specific request, 317 are used to trigger the start points of various simulations from equipment 318 to assembly, transfer the data to various specialized computers, 316, 311, 304, 303, to create virtual reality presentation 305, to supervise and optimize the operation regime of the controlled process. Transfer the data to various computer systems, 316, 311, 304, 303, is used to generate augmented reality to mobile devices, 310, worn by operators 320, 321, 322, that, localize the operator position, 312, and headset line of sight, 313, and object of interest, 318, where it makes image recognition of the object of interest, 318, or at operator's request, 317, based a menu list generates:

Descriptions of the object of interest;
Details of its status of operation;
Differences of parameters between measured and predicted;
Other information on the object present in data base;
Synchronizes with other team members;
Acquires data on operator's surroundings and transmits to database for general use;
Monitors operator's parameters;
Transmits operator various complex simulation scenarios and possible decision option outcomes;
Assures various communications, 314, 311, among team members 302, 320, 321, 322;
Informs team members on the optimum operations;
Alerts team members on potential events and emergencies appeared in the system, 306.

This assembly of hardware and software creates operator awareness increase in a system comprising a plurality of augmented reality visualization devices 303, 310 made of a virtual reality visualization enclosure 300, comprising, one or several individual visualization device placed on individuals 310, or placed on an enclosure, 303, where their movements and requests have to be correlated with the simulated image on each individual display.

A computing system 315, 317, 301, 304, 311, 316, is creating the virtual reality on demand that is provided to any operator in enclosure, 300, connected via equipment to computing system and/or operating independently, 320, 321, 322.

FIG. 4 describes an augmented reality mobile device 411, being, 310 in FIG. 3, on operators on move inside the controlled infrastructure or at control panel made of a head-on visualization device using camera, 422, placed on operator, 400, and projected on a device transferring it in operator's eyes, overlapped by virtual reality images generated by a remote computer.

Because operator location and its line of sight location accuracy is important, each local room has an entry location system, 402, that works synchronized with the gyroscope, 414, and accelerometers, 416, inclinometers, 415, magnetometers, 417, on the operators head, 410, able to recalibrate in each individual room equipped with a fixed reference, 403, in access area, 402, where the operator, 400, looks and presses, 401, calibration mode 407, button, making a location system at fixed reference, 408, that localized, 409, the operator's, 400, headset, 411, and its direction, 410, by identification of headset, 411, based on RFID, 412, and communication with headset, 404, 405, 406, exchanging coordinates.

On the head-set 411, there is an inertial base, with GPS, 413, on headset, and also comprising a 3 axis gyroscope, 414, a 3 directions accelerometers, 416, a 3 direction inclinometers, a 3 direction magnetometer, 417.

A location system on headset, 411, is also comprising a stereoscopic camera system 422, in various bands as visible, filtered, IR-night vision or IR-thermo-vision, an ultrasound distance measurement, 419, or an ultrasound locator (proximity sonar), 419, an EM spectrum analyzer/receiver, 418, a Lidar, 421, a Radar, 420, acting also as a telemetry detector as radar, laser detector.

A redundant communication system based on room/area level WiFi, 405, and IR emitter-receivers, 406, where the headsets are also equipped with compatible WiFi and IR receiver emitters, and cable connection ports, 404, in the area assuring communication management system in headset and central location with robust communication capabilities.

FIG. 5 describes a mobile operator, 500, bio-parameter monitoring system that is distributed on operator's body, 500, comprising a pulse rate/EKG, 514, a temperature measurement devices, 512, distributed on the body, 500, or in a most preferred singular location, an Oxygen level measurement, 510, correlated with breathing gas support 511, and measuring Breathing rate, 513, a skin conductivity, 509, and pH measurement, 517, correlated with electric functions (EEG, EKG, EMG), 516, and a distributed on body, 500, position of body components measurement 515.

Operator, 500, wearing an augmented reality headset, 507, is sitting on a fixed reference area, 501, in front of the entry wall, 502, with arm, 503, pressing the button, 504, in order that the room reference system of coordinates 505, to establish a communication 506, and recalibrate and transmit all parameters of interest.

FIG. 6 gives details on mobile operator, 600, environment monitoring system that is comprising, temperature sensors, 604, humidity sensor, 606, multi-gas monitoring sensor, 605, sound and vibration surround monitoring sensors 607, 611, radiation type and level measurement 608, EM spectrum monitoring, 609.

Mobile operator, 600, supplementary life support gear parameters monitoring for air or oxygen pressure, temperature, humidity, 612, correlated with external temperature field, 604, on hazmat suit, 614, including power supply control parameters for assisted heating or actuators, and Exo-skeleton control parameters, 610.

Operator headset, 603, pointing system and communication interface at operator choice, as joystick, eye tracker, 602, as part of augmented reality gear, including voice recognition.

FIG. 7 describes an operational situation, with 3 rooms, 700, 701, and 709 where the wireless communication from rooms 700 and 701 is not accessible in the room 709 due to shielding in the wall 708. Each local room has an entry location system, 703, that is used by the operator, 705, as soon as he penetrated the room, 700, through the door, 706, he steps in front of the location panel, 703, touches the calibration button with the hand 704, while having the direct communication cable, 707, connected. In this moment the coordinate system in his helmet and the room's coordinate system, 702, are synchronized, and he got the coordinates r, valid inside rooms 700, and 701. The same operator or another one, as soon as he passes through the wall 708, that negatively affects communication from near by room, 701, have to report himself at coordinate calibration entry point 710, that is connected via the wire 711 to the network, that includes the port 703, also. The calibration procedure is identical; operator, 715, connects the cable, 716, presses the button with the hand, 714, and is assigned to the room, 709, reference system, 712, with a new position vector r', 713, and also assigned to communication means active in that room. This is basically the procedure that helps keep track and have real-time, robust, communication with all operators no mater where they are located in the field.

FIG. 8 shows a computer system, 800, controlling the information flow with each headset, 801, and operator system, 802, and plant's computers, 803, 804, 805.

Plant level distributed computer structure, 803, 804, and data base, 805, which is processing data upon operator's request and is transmitting it to operator's headset, 801, as augmented and virtual reality content via its assigned communication computer, 806, that is preparing virtual and augmented reality display, 801.

A computer cluster, 808, that is concentrating data from various simulations and data acquisition sub-system and is preparing to be available to be sent to operator's augmented and virtual reality computer;

A simulation unit, 802, 803, that is using theoretical models on process and associated equipment in order to simulate its operation, and use the process measured data to benchmark and as initiating points for calculations;

A simulation and prediction data processing unit, 803, 804, 805, that uses a data base, 808, formed during previous operating regimes of that plant or similar ones, to predict the domains of likelihood of each parameter for a certain configuration and to signal anomalies;

A data acquisition sub-system, 807, that collects memorize and organize in databases the process generated data from instruments and controls, and prepares it for further use;

A subsystem, 803, that is acquiring and processing, image, sound and vibration data and prepares to be sent to operators via communication system, 806;

A sub-system that assures communication, 806, among operators, 801, 802, and computing system, in various regimes at demand;

A computing subsystem, 808, that stores in data bases the information about the plant layouts, instruments and equipment positioning and details, and generates guidance and all information to operators, 801, and maintenance teams.

EXAMPLES OF THE INVENTION

The current idea is a 3D digital simulation of the plant will be able to help plant's operators safely operates the equipment in any conditions.

The present patent is not intended to drastically change how the plant is operated, leaving in place the same control room, with the same controls, but to add a new layer of control based on data fusion and simulation, driving to a data driven operation.

When the present invention is applied to a power plant, based on coal, oil, etc., we think that the processes have to be sorted based on the need to react to them, or on emergency. For example the variation of the power demand and the fuel to feed the boiler may be more urgent, than the operations of purchasing fuel for reserves. Also in case of failure of a pump, an operator have to go to that point to learn more about the circumstances while the main room have to immediately deal with that reducing the power or starting auxiliary pumps . . . . In this circumstances a simulation of the parameter's evolution, pre-calculated and updated for the current data will be a good guidance for operators to decide if only a supplementary pump have to be started or an emergency shutdown is required in order to prevent further damage. If there are several power groups, working together, this information about the failure have to be transmitted and they have to increase their power levels to meet the demand, or transmit the information up in the network that a dispatcher to make real time decision.

Various simulations will show operator what should be happening in the future if a decision or another is taken, compared to what is actually happening and will be able to notify the operator if something is wrong. The simulation will also tell the operator what the best way to get maximum power, and how to take corrective action if something does go wrong.

The 3D augmented reality immersive system offers using field data fusion with predictive simulations a holistic view of the nuclear reactor state, safety and system health and advices possible future paths.

This is useful for nuclear reactor operators to detect in real time any issue in the reactor, to optimize maintenance and have minimized the human factor instrumentation probability.

The system can also later be built to where it runs the whole nuclear power plant autonomously creating less risk of human error.

For example in nuclear power production by buying this product the customer will reduce the human factor contribution to a nuclear event making it end up in an incident, rather than becoming an accident.

The probability of nuclear accident is now of about 0.07%, that means an average cost of $5B per year and an average cost of insurance per reactor of $50 M/y per power plant. Supposing that this system will reduce the probability of accident or its magnitude by only 10% it will give a gain of about $5M/year per plant, and possible cover in one year or two, the cost of this new equipment. In nuclear power plant, the complexity is higher, because nuclear reactor is more complex and difficult to operate than a usual heat source used in conventional power plants, and the role of such equipment might become even more important.

Other plants that may successfully use this augmented and virtual reality system, are in oil processing, chemistry, foundries, manufactures, etc.

The invention claimed is:

1. A system to increase operator awareness comprising:
a. Plurality of augmented reality visualization devices made of:
   I. Virtual reality visualization enclosure comprising:
      i. One or several individual visualization device placed on individuals inside an enclosure, where their movements and requests are correlated with a simulated image on each individual display;
      ii. A computing system creating a virtual reality on demand provided to any operator in enclosure connected to the equipment computing system and operating independently;
   II. Augmented reality mobile devices located on operators moving inside the controlled infrastructure or at control panel, made of:
      i. A head-on visualization device using camera placed on operator and projected on a device transferring it in operator's eyes, overlapped by virtual reality images generated by a computer;
      ii. A local room location system, that works synchronized with a gyroscope and accelerometers, inclinometers, magnetometers on the operators head, able to recalibrate in each individual room comprising:
         a. Fixed reference in access area where the operator looks and presses calibration mode;
         b. Location system at fixed reference that localized the operator's headset, and its direction;
         c. Identification of headset, based on RFID and communication with headset exchanging coordinates;
         d. Inertial base on headset, comprising:
            i. 3 axis gyroscope;
            ii. 3 directions accelerometers;
            iii. 3 direction inclinometers;
            iv. 3 direction magnetometer;
         e. Location system on headset comprising:
            i. Stereoscopic camera system in various bands as visible, filtered, IR-night vision or IR-thermovision;
            ii. Ultrasound distance measurement;
            iii. Ultrasound locator (proximity sonar);
            iv. Lidar;
            v. Radar;
            vi. Telemetry detector as radar, laser detector;
         f. Redundant Communication system comprising:
            i. Room/area level WiFi and IR emitter-receivers;
            ii. Headset WiFi and IR receiver emitters;
            iii. Cable connection ports in the area;
            iv. Communication management system in headset and central location;
         g. Mobile operator bio-parameter monitoring system comprising:
            i. Pulse rate;
            ii. Temperature;
            iii. Oxygen level;
            iv. Breathing rate;
            v. Skin conductivity and pH;
            vi. Electric functions (EEG, EKG, EMG);
            vii. Position of body components;
         h. Mobile operator environment monitoring system comprising:
            i. Temperature sensors;
            ii. Humidity sensor;
            iii. Multi-Gas monitoring;
            iv. Sound and vibration surround monitoring;
            v. Radiation type and level measurement;
            vi. EM spectrum monitoring;
         i. Mobile operator supplementary life support gear parameters monitoring comprising:
            i. Air or oxygen pressure, temperature, humidity;
            ii. External temperature field on hazmat suit;
            iii. Power supply control parameters for assisted heating or actuators;
            iv. Exo-skeleton control parameters;
         j. Operator headset pointing system and communication interface at operator choice, as;
            i. joystick,
            ii. eye tracker,
            iii. voice recognition;
   III. A computer system controlling information flow with each headset and operator system and plant's computers;
b. Plant level distributed computer structure and data base, which is processing data upon operator's request and is transmitting it to operator's headset as augmented and virtual reality content via its assigned communication computer that is preparing virtual and augmented reality display;

c. A computer cluster that is concentrating data from various simulations and data acquisition sub-system and is preparing to be available to be sent to operator's augmented and virtual reality computer;
d. A simulation unit that is using theoretical models on process and associated equipment in order to simulate its operation, and use process measured data to benchmark and as initiating points for calculations;
e. A simulation and prediction data processing unit, that uses a data base formed during previous operating regimes of that plant or similar ones, to predict domains of likelihood of each parameter for a certain configuration and to signal anomalies;
f. A data acquisition sub-system that collects memorize and organize in databases the process generated data from instruments and controls, and prepares it for further use;
g. A subsystem that is acquiring and processing, image, sound and vibration data and prepares to be sent to operators via communication system;
h. A sub-system that assures communication among operators and computing system, in various regimes at demand;
i. A computing subsystem that stores in data bases the information about the plant layouts, instruments and equipment positioning and details, and generates guidance and all information to operators, and maintenance teams.

2. A system to increase operator awareness according claim 1, that uses a redundant local network to connect the operator headsets and associated monitoring devices that provide case sensitive or on demand augmented and virtual reality to operators.

3. A system to increase operator awareness according claim 1, where the communication system is controlled by computer acting in closed circuit, in various regimes.

4. A system to increase operator awareness according claim 1 where operator coordinate location system has calibration points in several locations around the plant.

5. A system to increase operator awareness according claim 1 having specialized gear to monitor operator's biometric parameters in a modular fashion depending on plant specific requirements.

6. A system to increase operator awareness according claim 1 where the simulating computing system that uses theoretical models runs independently of the simulating system that uses previous operating parameters of that or similar process to predict future evolution.

7. A system to increase operator awareness according claim 1 where the control room and process control procedures are not changed by the application of the operator augmented and virtual reality system.

8. A system to increase operator awareness according claim 1 that integrates all acquired data from instruments, video, audio and vibration to create the augmented reality.

9. A system to increase operator awareness according claim 1 that uses various modes to achieve the communication between operator and computing system.

10. A system to increase operator awareness according claim 1 that does not interfere with the controls of the process, and is the operator the person that actuates the controls in the same manner as without the system.

11. A system to increase operator awareness according claim 1 where the operator's headset have been equipped with local installation location devices and stereoscopic imaging.

* * * * *